Figure 1:
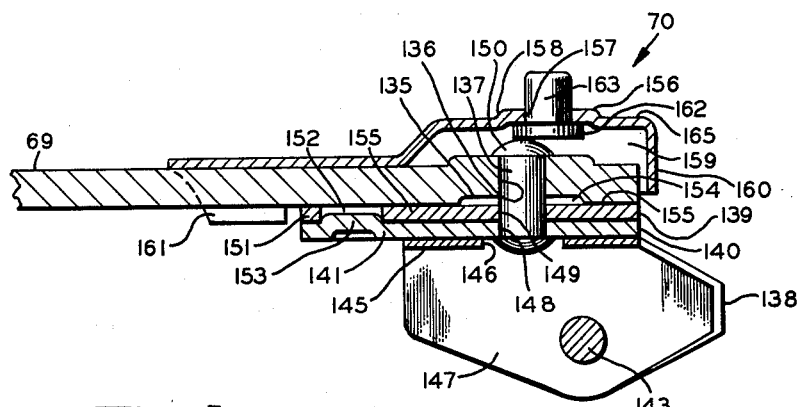

March 31, 1964　　　F. A. KROHM　　　3,126,567
WIPER ARM ASSEMBLY
Original Filed Nov. 19, 1958

INVENTOR.
FRED A. KROHM
BY
ATTORNEY

3,126,567
WIPER ARM ASSEMBLY
Fred A. Krohm, Hobart, Ind., assignor to The Anderson Company, a corporation of Indiana
Original application Nov. 19, 1958, Ser. No. 774,955, now Patent No. 3,064,297, dated Nov. 20, 1962. Divided and this application Feb. 27, 1961, Ser. No. 91,881
7 Claims. (Cl. 15—250.32)

This invention relates generally to windshield wiper arms and more particularly is directed to improved means on an arm adapted for connection with a wiper blade assembly.

A significant object of the invention is to provide a wiper arm with a connection means or connector which is adjustably attached to the arm in a novel manner.

A specific object of the invention is to provide a component of a windshield wiper apparatus with an indicator, which is associated with the component in a unique way.

The above and other objects and advantages of the invention will become apparent after the description hereinafter set forth is considered in conjunction with the drawings annexed hereto.

Figure 2:
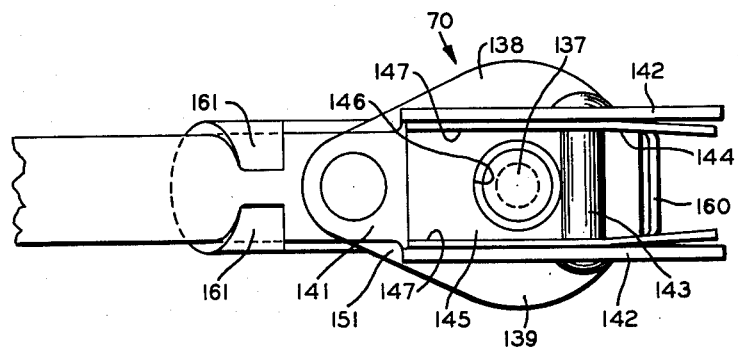

In the drawings:

FIGURE 1 is an enlarged longitudinal sectional view of an outer section of a wiper arm showing the structure of the connection means carried thereby for supporting a wiper blade; and FIGURE 2 is a bottom view of the structure depicted in FIGURE 1.

This application is a division of my copending application Serial No. 774,955 filed November 19, 1958, now Patent No. 3,064,297.

The connection means generally designated 70 and clearly illustrated in FIGURES 1 and 2 will now be described. An outer arm section 69 is provided with a transversely disposed raised resiliently flexible channel formation 135 which is inset a predetermined distance inwardly from the end of the section and provided with a centrally disposed aperture 136 through which a fastening means, preferably in the form of a rivet 137, extends for pivotally connecting a channel connector member 138 and a friction member 139 to the arm section. More specifically in this respect, the channel connector includes a base wall 140 provided with a rearwardly extending continuation 141 and corresponding side walls 142 through which a cylindrical cross pin 143 extends for pivotal connection with a fitting carried by a wiper blade.

A channel-shaped resiliently flexible liner 144 is secured in the channel connector by the cross pin and includes a base wall 145 having a clearance opening 146 therein for an upset end of the rivet and side walls 147 having holes therein through which the pin extends. The forward extremities of the side walls are preferably inturned at an angle, as shown in FIGURE 2, for straddling engagement with the fitting on the blade in order to prevent vibration or rattle therebetween. The liner also serves to promote a smooth acting pivotal connection between the connector and fitting and is preferably constructed from desirable material, such as bronze, so as to prevent galling therebetween. The base wall 140 of the connector channel and the friction member 139 are respectively provided with apertures 148 and 149 through which the rivet extends. The rivet has a head 150 which bears against the upper surface of the channel formation 135 formed on the arm section.

The friction member 139 is preferably of a resiliently flexible character and includes a rearwardly extending continuation or radial portion 151 which is provided with an opening 152, which receives an offset projection or detent 153 provided on the continuation 141 of the channel connector for connecting or joining the member and connector for pivotal or rotational movement as a unit with respect to the arm. Obviously, the connector and member could be secured together for unison movement in various other ways. For example, the detent could be placed on the member and the opening in the connector in lieu of the arrangement shown, or they could be welded together.

The organization is preferably such that when the connector and friction member are firmly secured to the arm by the rivet, an annular portion or central portion of the member close to the rivet will be flexed or distorted upwardly into a recess 154 defined by the channel formation 135 on the arm and thereby cause outer portions of the member beyond this central area to exert appreciable pressure against inner spaced surfaces 155 of the arm section on opposite sides of the recess or channel formation and against the upper surface of the base wall of the connector on opposite sides of the rivet. Attention is directed to the fact that the raised portion 135 of the arm section 69 is also distorted or flexed toward the friction element due to the relief offered by the recess 154, so that either this element and/or the raised portion will serve to retard relative movement between the connector and arm to the extent desired. With this unique setup the connector and friction member as a unit, including a blade attached thereto, can be readily manually pivoted or rotated relative to the arm to any correct angular position desired for properly wiping the greatest area of a windshield permitted by the installation. Due to the frictional resistance afforded by the organization, the blade will be automatically held at any angle to which it has been adjusted.

In order to promote the general appearance of the connector means, a shroud or cover is preferably connected to the outer arm section for covering a portion of the section and particularly the head 150 of the rivet. This shroud is preferably made in the form of an elongate channel having an enlarged outer extremity and a smaller inner extremity. The enlarged extremity includes a base wall 165 formed to provide an elevated annular portion or platform 156 having an opening 157 therein and portions 158 which slope upwardly and join the annular portion. The shroud also includes side walls 159 which straddle the marginal edges of the outer arm section and an end wall 160 which extends downwardly across the end edge of the arm section. The smaller extremity of the shroud includes a base wall portion and side wall portions which constitute continuations of the base wall and side walls of the larger extremity. The shroud may be secured in place in various ways, but as shown this is preferably accomplished by providing the side wall portions of the smaller extremity with fingers or lugs 161 which are inturned against the underside of the arm section to firmly and permanently secure the shroud thereto.

The means employed to identify the origin of the product and impart a significant structural characteristic thereto preferably comprises a button having an annular base 162, which is held between certain arm components, such as the shroud and rivet, so that an axial cylindrical portion 163 of the button will extend through the opening 157 in the shroud. The outer end of the axial portion is preferably rounded or made convex to improve its appearance. The button is preferably made of suitable plastic, which may be colored as desired so as to attract one's eye thereto. In other words, the design, construction and color of the button are such that it is attractive and harmonizes with the general design of the arm proper.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. A windshield wiper arm part constructed from bar stock having an offset portion forming a recess, a resiliently flexible member provided with an opening, a channel fitting for attachment to a wiper blade and provided with a projection disposed in said opening, and pivot means extending through the offset portion, member and fitting for firmly securing them together so that a portion of the member will be flexed into the recess and the fitting and member as a unit may be manually pivoted with respect to the arm part to any desired position and automatically held in such position.

2. A windshield wiper arm part constructed to provide a raised transversely disposed channel portion forming a recess at the underside of the arm, a fitting for attachment to a wiper arm, a plate member interposed between the arm part and fitting and bridging the recess, means securing the arm part, fitting and member in assembled relationship to cause a portion of the member to be distorted into the recess in a manner whereby to retard relative pivotal movement between the fitting and arm part, and a shroud overlying said raised portion of said arm and said securing means.

3. In combination: an elongate element constituting a component of a windshield wiper arm, an intermediate member having an extended portion, a fitting for attachment to a wiper blade, and having an extended portion underlying the extended portion of said member, means extending through the element, member and fitting for firmly securing them together, and means connecting said extended portions for keying the member and fitting together for pivotal movement as a unit with respect to the wiper arm element.

4. A windshield wiper arm part provided with an offset resiliently flexible portion, a connector located under the arm part for attachment to a wiper blade, and means extending from the connector through the offset portion of the arm for flexing the offset portion in a manner whereby to offer frictional resistance when the connector is pivoted relative to the arm part.

5. A windshield wiper arm part provided with an offset resiliently flexible portion, a connector part located under the arm part for attachment to a wiper blade, a resiliently flexible part interposed between the offset portion of the arm and the connector, means securing the parts together in a manner whereby to flex the offset portion and the flexible part so as to offer resistance when the connector is moved relative to the arm part, and a shroud connected to the arm part and overlying said connector part.

6. A windshield wiper arm part, a connector part adapted for connection with a wiper blade, one of said parts being provided with an offset, pivot means extending through the parts permanently securing them together to cause a portion of one of the parts to flex into the offset to provide a connection offering appreciable frictional resistance to pivotal movement between the parts, and a shroud connected to the arm part and overlying the connector part.

7. In combination: an elongate element constituting a component of a windshield wiper arm, a connector member for attachment to a wiper blade, an intermediate member having a resiliently flexible portion interposed between the element and connector member, pivot means extending through the element and members for firmly securing them together to compress the said portion and thereby offer appreciable resistance to pivotal movement between the connector member and element, one of said members being provided with an opening, the other with a projection disposed in the opening for locking the members together for pivotal movement as a unit, a shroud secured to the arm part, and a colored indicator extending from said shroud.

References Cited in the file of this patent

UNITED STATES PATENTS 2,676,821  Reichelderfer _____ Apr. 27, 1954

UNITED STATES PATENT OFFICE
CERTIFICATE OF CORRECTION

Patent No. 3,126,567 March 31, 1964

Fred A. Krohm

It is hereby certified that error appears in the above numbered patent requiring correction and that the said Letters Patent should read as corrected below.

Column 3, line 29, for "blade," read -- blade --.

Signed and sealed this 2nd day of February 1965.

(SEAL)
Attest:

ERNEST W. SWIDER
Attesting Officer

EDWARD J. BRENNER
Commissioner of Patents